(12) United States Patent
Fujimori

(10) Patent No.: US 6,344,267 B1
(45) Date of Patent: Feb. 5, 2002

(54) FOAMED POLYSTYRENE PRODUCTS AND METHOD FOR THEIR PRODUCTION

(76) Inventor: Takashi Fujimori, 1054-8, Otono, Kishimoto-machi, Saihaku-gun, Tottori 689-4121 (JP)

( * ) Notice: Subject to any disclaimer, the term of this patent is extended or adjusted under 35 U.S.C. 154(b) by 0 days.

(21) Appl. No.: 09/485,667

(22) PCT Filed: May 28, 1999

(86) PCT No.: PCT/JP99/02817

§ 371 Date: Mar. 7, 2000

§ 102(e) Date: Mar. 7, 2000

(87) PCT Pub. No.: WO99/64503

PCT Pub. Date: Dec. 16, 1999

(30) Foreign Application Priority Data

Jun. 12, 1998 (JP) .......................................... 10-164733

(51) Int. Cl.[7] .............................. B32B 3/00; B32B 3/26; B32B 5/22; B29B 9/00
(52) U.S. Cl. ............................... 428/313.5; 428/319.1; 428/317.9; 264/5
(58) Field of Search ........................... 428/313.5, 319.1, 428/317.9; 264/5, 6, 7

(56) References Cited

FOREIGN PATENT DOCUMENTS

| JP | 45-41101 | 12/1970 |
| JP | 47-16565 | 9/1972 |
| JP | 50-86564 | 7/1975 |
| JP | 51-59963 | 5/1976 |
| JP | 51-69545 | 6/1976 |
| JP | 51-676525 | 6/1976 |
| JP | 52-79979 | 1/1978 |
| JP | 1-22938 | 1/1989 |
| JP | 3-121144 | 5/1991 |

*Primary Examiner*—Tom Dunn
*Assistant Examiner*—Zidia Pittman
(74) *Attorney, Agent, or Firm*—Dennis G. LaPointe; Mason & Associates, PA

(57) ABSTRACT

After being mixed with a boric acid-based inorganic material, styrene beads are pre-formed and then left to age. Thereafter, a Styrofoam product (1) is produced by adding boric acid-based inorganic materials to the pre-formed beads and conducting a main expansion treatment. The surface of each foamed styrene bead (2) of the Styrofoam product (1) is covered by a coating film (3). If exposed to fire, the coating films (3) suppress burning of the styrene beads (2). In case a great quantity of heat is applied, the vitreous coats into which the coating films (3) have changed to prevent the styrene beads (2) from burning deeper. As the vitreous coats absorb black smoke, generation of black smoke is prevented.

6 Claims, 1 Drawing Sheet

FOAMED POLYSTYRENE PRODUCTS AND METHOD FOR THEIR PRODUCTION

TECHNICAL FIELD

The present invention relates to fire resistive foamed polystyrene herein referred to as "Styrofoam" products and a method of their production.

BACKGROUND OF THE INVENTION

One of typical examples of conventional methods of producing a Styrofoam product calls for producing partially formed beads by conducting preliminary forming of numerous styrene beads that have been produced by forming polystyrene into the shape of beads, and then, after leaving these pre-expanded beads to age, expanding them properly.

As conventional Styrofoam products having thus produced are not only light in mass but also non-hygroscopic, superbly heat insulating, easy to handle and very inexpensive, they enjoy a tremendous demand and are widely used in the field of ordinary houses, building materials, miscellaneous goods or the like.

Conventional Styrofoam products, however, have drawbacks such that they have little ability to withstand fire and, when exposed to fire, are easy to become contracted and deformed so that their entire shape collapses instantly.

In order to solve the above problem, the present invention relates to Styrofoam products that have superior fire resistance and are capable of limiting degree of contraction and deformation caused by fire. The present invention also relates to a method of producing such Styrofoam products.

DISCLOSURE OF THE INVENTION

A Styrofoam product according to the present invention includes one or more formed styrene beads and a coating film or coating films that contain boric acid-based inorganic materials and are formed on the surface(s) of the styrene bead(s). As a coating film or coating films containing boric acid-based inorganic materials are thus formed on the surface(s) of the formed styrene bead(s), the coating film(s) suppress burning of the styrene bead(s). In case a great quantity of heat is applied, the vitreous coat into which each coating film has chemically changed prevents the styrene bead from burning deeper. Therefore, the invention increases the heat resisting ability of the Styrofoam product and prevents its thermal contraction and deformation.

A Styrofoam product according to another feature of the present invention includes a plurality of styrene beads that have been expanded and solidly bonded to one another, and coating films that contain boric acid-based inorganic materials and are respectively formed on the surfaces of the styrene beads. As coating films containing boric acid-based inorganic materials are thus formed on the surfaces of the styrene beads, which have been expanded and solidly bonded to one another, the coating films suppress burning of the styrene beads. In case a great quantity of heat is applied, the vitreous coats into which the coating films have chemically changed prevent the styrene beads from burning deeper. The invention thus increases the heat resisting ability of the Styrofoam product and prevents its thermal contraction and deformation.

A method of producing a Styrofoam product according to the invention calls for producing a beads mixture by mixing styrene beads with a boric acid-based inorganic material, producing partially foamed beads by pre-expanding the beads mixture, producing additive-containing beads by adding boric acid-based inorganic materials to the partially foamed beads, and conducting a main expansion treatment to the additive-containing beads. As a result of the above method, coating films containing boric acid-based inorganic materials are formed on the surfaces of the foamed styrene beads, and the coating films increase the fire resistive ability of the Styrofoam product and prevent its thermal contraction and deformation.

A method of producing a Styrofoam product according to another feature of the invention calls for producing a beads mixture by mixing styrene beads with a boric acid-based inorganic material, producing partially foamed beads by pre-expanding the beads mixture, producing additive-containing beads by adding boric acid-based inorganic materials and a thermosetting resin to the partially expanding beads, and conducting a main expansion treatment to the additive-containing beads. As a result of the above method, coating films containing boric acid-based inorganic materials and a thermosetting resin are formed on the surfaces of the formed styrene beads. Therefore, because of synergistic effect between the boric acid-based inorganic materials and the thermosetting resin, the coating films increase the fire resistance of the Styrofoam product and reliably prevent its thermal contraction and deformation.

A method of producing a Styrofoam product according to yet another feature of the invention calls for producing a beads mixture by mixing styrene beads with a boric acid-based inorganic material, producing partially formed beads by pre-forming the beads mixture, producing additive-containing beads by adding a fibrous material, as well as boric acid-based inorganic materials and a thermosetting resin, to the partially formed beads, and conducting a main expansion treatment to the additive-containing beads. As a result of the above method, coating films that contain boric acid-based inorganic materials and a thermosetting resin and are formed on the surfaces of the formed styrene beads increase the fire resistance of the Styrofoam product and reliably prevent its thermal contraction and deformation. Furthermore, the fibrous characteristics of the fibrous material increases the strength of the product.

A method of producing a Styrofoam product according to yet another feature of the invention calls for producing a beads mixture by mixing styrene beads with a boric acid-based inorganic material, producing pre-formed beads by preliminary forming the beads mixture, producing additive-containing beads by adding either one of or both an amino-based resin and a polyamide resin, as well as boric acid-based inorganic materials, a thermosetting resin and a fibrous material, to the pre-formed beads, and conducting a main expansion treatment to the additive-containing beads. As a result of the above method, coating films that contain boric acid-based inorganic materials and a thermosetting resin and are formed on the surfaces of the formed styrene beads increase the fire resistance of the Styrofoam product and reliably prevent its thermal contraction and deformation. Furthermore, the fibrous characteristics of the fibrous material increases the strength of the product, and the amino-based resin and/or the polyamide resin make the product tough.

PREFERRED EMBODIMENT OF THE INVENTION

Figure 1:
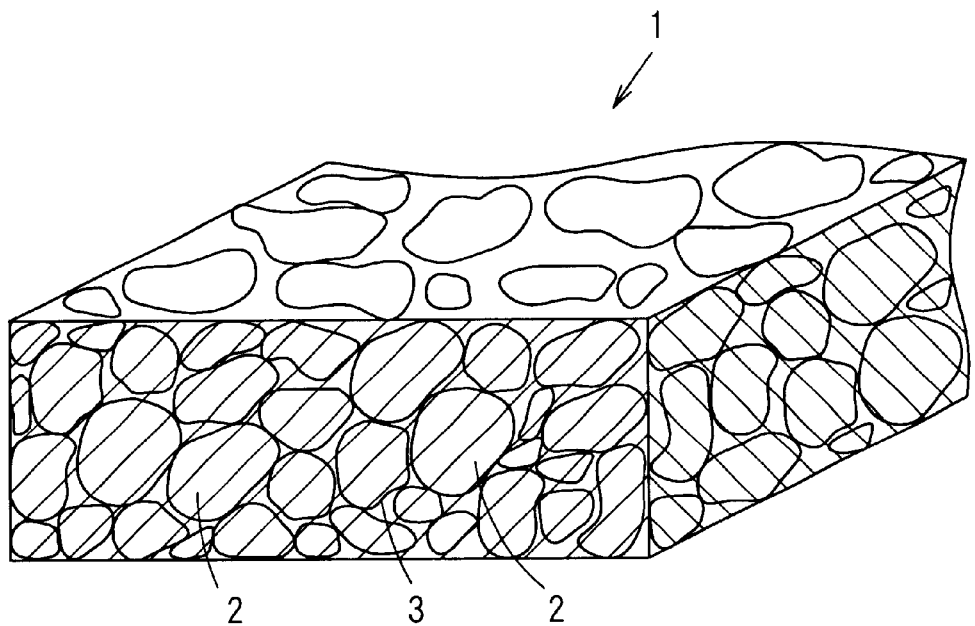
FIG. 1 is a perspective view of an embodiment of Styrofoam according to the invention.

Next, an embodiment of the present invention is explained hereunder, referring to the drawings.

Referring to FIG. 1, numeral 1 denotes a Styrofoam product. The Styrofoam product 1 has numerous formed styrene beads 2, which have been produced by foaming raw bead particles (not shown) into a given dimension. The aforementioned raw bead particles are styrene beads produced by forming polystyrene ($[CH_2CH(C_6H_5)]_n$) into the shape of beads. The expanded styrene beads 2, each of which has been formed into a generally spherical shape, are solidly joined together so that they form as a whole a given shape, for example the shape of a rectangular plate.

The Styrofoam product 1 described above is intended for use as a material for a construction-related material, such as a board for building material, as well as various products for interior designing, preparation for emergency and disaster, outdoor goods, toys, and so forth.

Figure 2:
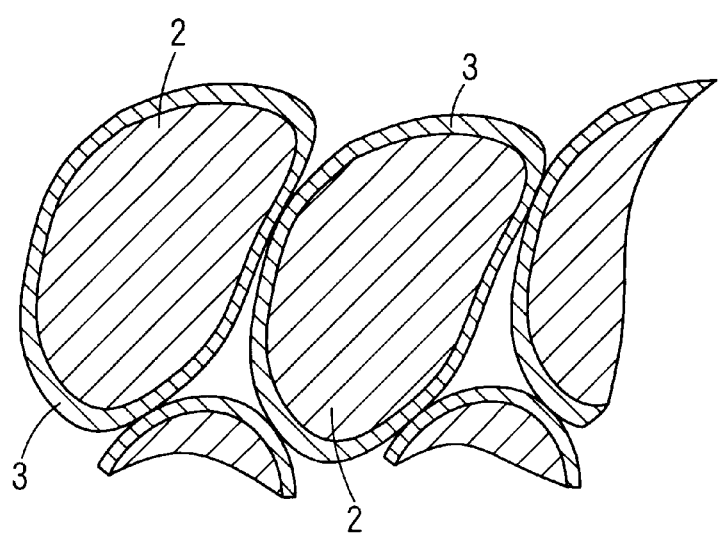
FIG. 2 is an enlarged sectional view of a part of said Styrofoam.

Each formed styrene bead 2 is provided with a coating film 3. As shown in FIG. 2, this coating film 3 may be formed over the entire surface of the formed styrene bead 2. The coating film 3 may contain boric acid-based inorganic materials, a thermosetting resin, an amino-based resin, a polyamide resin, a fiber material, etc.

Next, the method of producing the Styrofoam product 1 described above is explained hereunder.

First, a beads mixture is produced by mixing raw bead particles, i.e. styrene beads, with a boric acid-based inorganic material, which may contain boric acid powder, an aqueous solution of a boric acid, or the like. Then, preformed beads are produced by preliminary foaming the beads mixture. The method of preliminary foaming may employ any appropriate treatment method, examples of which include those using vapor, heat radiation, infrared hot blast or boiling water.

After leaving these pre-formed beads to age, additive-containing beads are produced by adding boric acid-based inorganic materials, which may include boric acid powder, an aqueous solution of a boric acid, or the like, to the pre-formed beads. At that time, a thermosetting resin, such as a phenolic resin, an amino-based resin, a polyamide resin, a fiber material, etc. may be added in addition to the boric acid-based inorganic materials, if it is necessary.

Finally, the additive-containing beads undergo a main expansion treatment. Thus, production of the Styrofoam product is completed.

The production process is explained in more detail hereunder.

(1) A beads mixture is produced by thoroughly mixing boric acid powder ($H_3BO_3$) with raw bead particles, i.e. styrene beads, with a mass mixing ratio of the boric acid powder to the raw bead particles ranging from 10 to 50%.

(2) Pre-formed beads are produced by giving the beads mixture a steam treatment or a boiling water treatment by using a dedicated rotary preliminary forming apparatus so as to pre-forming the beads mixture. In case of a boiling water treatment, a boric acid solution is produced by mixing boric acid powder into water with a mass mixing ratio of the boric acid powder to the water ranging from 10 to 50% and heating the mixture. The raw bead particles are then put into the solution. The expansion ratio may preferably be 30 to 70 times the original volume.

(3) After the pre-formed beads are left for 12 to 24 hours to become stable, raw materials selected from among the following items are added to the pre-formed beads so as to produce additive-containing beads. The mass percentages mentioned in the following sub-paragraphs refer to the mass mixing ratios of the respective raw materials used to the mass of the pre-formed beads. Of the materials listed in the following sub-paragraphs, those referred to in sub-paragraph d, e and f are not essential; a material or materials selected from among them should be added if it is necessary, depending on the product to be produced.

a 10 to 15% aqueous solution of a boric acid ($H_3BO_3$) in addition to either a sodium silicate (NaO n$Sio_2$ n$H_2O$: n=2 to 4) or a lithium silicate ($Li_4SiO_4$, $Li_2SiO_3$, $Li_2SiO_3$. n$H_2O$, etc.) (30 to 50% by weight);

b boric acid ($H_3BO_3$) powder (50 to 200% by mass, desirably about 75% by mass);

c one or more compounds selected from the group consisting of aluminum silicate ($Al_2SiO_5$), potassium silicate ($K_2SiO_3$, $KHSi_2O_3$, etc.), borax ($Na_2B_4O_7 10H_2O$), lauryl alcohol ($CH_3(CH_2)_{11}OH$), shirasu balloon, aluminum hydroxide ($Al(OH)_3$), and magnesium hydroxide ($Mg(OH)_2$) (10 to 100% by mass);

d phenolic resin (1 to 100% by mass, desirably about 75% by mass);

e organic or inorganic fiber made of, for example, cotton, linen, silk, wool, rock wool, glass, ceramics or the like (1 to 10% by mass);

f one or more materials selected from the group consisting of amino-based resin melamine or guanamine resin, polyamide resins, ethylene glycol, waxes, vegetable oils, etc. (1 to 51% by mass).

(4) Taking care to not apply a heavy load to the styrene beads, all the additive-containing beads are stirred by using a dedicated stirrer so that the aforementioned additives and the pre-formed beads are blended together completely evenly.

(5) The additive-containing beads thus stirred are then given a main expansion treatment. To be more specific, the additive-containing beads are filled into a given metal mold and heated for one to five minutes at a temperature of 100 to 150° C. In case steam is used, the heat treatment is carried out by passing the metal mold through 7 kg/cm3 steam for one to five minutes.

(6) Finally, after cooling the metal mold, the finished Styrofoam product is removed from the metal mold.

The Styrofoam product 1 thus produced is different from conventional products in that a given coating treatment is carried out in order to form a coating film 3 on the surface of each one of the styrene beads 2 that haven been expanded and solidly bonded to one another.

In case the Styrofoam product 1 is exposed to fire, the coating films 3 suppress burning of the expanded styrene beads 3. A great quantity of heat, if applied to the product, change the coating film 3 into metaboric acid ($HBO_2$), tetraboric acid ($H_2B_4O_7$) and vitreous coating at a temperature of 100 to 160° C., and into boric anhydride ($B_2O_3$) at a higher temperature.

The vitreous coating prevents the formed styrene beads 2 from burning deeper. As the vitreous coating is a substance having numerous, extremely small pores and are capable of absorbing black smoke, it prevents generation of black smoke.

The embodiment described above calls for forming a coating film 3 containing boric acid-based inorganic materials on the surface of each formed styrene bead 2 by means of a given coating treatment. Therefore, when exposed to fire, the coating films 3 suppress burning of the formed styrene beads 3. Should a great quantity of heat be applied to the product, the vitreous coating into which the coating film 3 has chemically changed prevents the formed styrene bead 2 from burning deeper. Furthermore, the vitreous coating absorbs black smoke and thus prevents generation of black smoke. The embodiment described above thus prevents generation of black smoke when burned, has increased resistance to heat and is capable of limiting degree of contraction and deformation caused by heat.

In case the coating films 3 contain a thermosetting resin, hardening of the resin further reduces the burning of the formed styrene beads 2. In case the coating films 3 contain a fibrous material, the strength of the coating films 3 can be increased by the fiber of the fibrous material. In case the coating films 3 contain an amino-based resin or a polyamide resin, the coating films 3 are made tough.

The processes of producing Styrofoam products 1 are not limited to those described above; a Styrofoam product 1 may be produced by a process including a step that calls for forming a coating film containing boric acid-based inorganic materials over the surface of each formed or unformed styrene bead by using, for example, a phenyl borate resin or a phenyl borate resin oligomer. The aforementioned phenyl borate resin may be produced through reaction of a phenyl borate with formaldehyde without the presence of water, said phenyl borate generated from reaction between a boric acid and phenol hydroxyl groups. A phenyl borate resin oligomer may be produced through reaction of a phenyl borate with hydroxyl groups of a phenolic resin oligomer.

Next, two actual examples are described below:

ACTUAL EXAMPLE 1

As an experiment, a Styrofoam product according to the embodiment described above was produced by using the following materials, and it was ascertained that the finished product was resistant to fire, with no black smoke generated when the product was exposed to fire.

a pre-formed beads (50 g)
 b aqueous solution of boric acid (40 g of a solution containing 15 mass % boric acid to water)
 c boric acid powder (40 g)
 d aluminum silicate and potassium silicate (20 g)
 e a phenolic resin, such as resol or novolak (20 g)
 f phenolsulfonic acid ($C_6H_4(OH)SO_3H$) (1 g)

Additive-containing beads consisting of said materials were generated from a given amount of raw bead particles and other materials prepared beforehand. After being stirred, the additive-containing beads were filled into a given metal mold frame having a thickness of 20 cm, a length of 230 cm and a width of 230 cm.

Then, the metal mold frame was heated until the temperature of the metal mold frame reached 110° C. When two minutes had passed after the temperature reached 110° C., the metal mold frame was cooled. After the metal mold frame was cooled to a temperature in the range from 60 to 70° C., the Styrofoam product was removed from the metal mold frame.

Then, the Styrofoam product was directly exposed to the flame of an alcohol lamp for two to three minutes. Although a minimal amount of white smoke was generated, no black smoke was generated. Furthermore, the product retained its shape, without any contraction or deformation.

ACTUAL EXAMPLE 2

As another experiment, a Styrofoam product according to the embodiment described above was produced by using the following materials, and it was ascertained that the finished product was resistant to fire, with no black smoke generated when the product was exposed to fire.

a pre-foamed beads (50 g)
 b sodium silicate (50 g)
 c aqueous solution of boric acid (50 g)
 d aluminum silicate and potassium silicate (30 g)

Additive-containing beads consisting of said materials were generated from a given amount of raw bead particles and other materials prepared beforehand. After being stirred, the additive-containing beads were filled into a metal mold frame similar to the one used for Actual Example 1 described above. Thereafter, a main expansion treatment was carried out by following the same procedure as that of Actual Example 1. Thus, a Styrofoam product was obtained.

Then, the Styrofoam product was directly exposed to the flame of an alcohol lamp.

Although the surface melted by approximately 2.0 to 2.5 mm, the product retained its shape, without any further contraction or deformation, even after being continuously exposed to the fire.

POSSIBLE INDUSTRIAL APPLICATION

As described above, Styrofoam products and the method of their production according to the present invention are widely applicable to various building materials, miscellaneous goods, etc. that are required to be light in weight and fire resistant. The invention is particularly suitable to be used in heat insulating boards for walls, floors or the like.

What is claimed is:

1. A polystyrene product including:
   one or more formed polystyrene beads; and
   a coating film or coating films that contain boric acid-based inorganic materials and are formed on the surface(s) of the polystyrene bead(s).

2. A polystyrene product including:
   a plurality of polystyrene beads that have been formed and solidly bonded to one another; and
   coating films that contain boric acid-based inorganic materials and are respectively formed on the surfaces of the polystyrene beads.

3. A method of producing a polystyrene product comprising the steps of:
   producing a beads mixture by mixing polystyrene beads with a boric acid-based inorganic material;
   producing pre-formed beads by pre-forming said beads mixture; then
   producing additive-containing beads by adding boric acid-based inorganic materials to said pre-formed beads; and
   conducting a main expansion treatment to said additive-containing beads.

4. A method of producing a polystyrene product comprising the steps of:
   producing a beads mixture by mixing polystyrene with a boric acid-based inorganic material;
   producing pre-expanded beads by pre-expanding said beads mixture; then
   producing additive-containing beads by adding boric acid-based inorganic materials and a thermosetting resin to said pre-expanded beads; and conducting a main expansion treatment to said additive-containing beads.

5. A method of producing a polystyrene product comprising the steps of:
   producing a beads mixture by mixing polystyrene beads with a boric acid-based inorganic material;

producing pre-expanded beads by pre-expanding said beads mixture; then producing additive-containing beads by adding boric acid-based inorganic materials and a thermosetting resin to said pre-expanded beads and also adding a fibrous material to the same; and; and conducting a main expansion treatment to said additive-containing beads.

6. A method of producing a polystyrene product comprising the steps of:

producing a beads mixture by mixing polystyrene beads with a boric acid-based inorganic material;

producing pre-expanded beads by pre-expanding said beads mixture; then producing additive-containing beads by adding boric acid-based inorganic materials, a thermosetting resin and a fibrous material to said pre-expanded beads and also adding either one of or both and amino-based resin and a polyamide resin to same; and conducting a main expansion treatment to said additive-containing beads.

* * * * *